(12) United States Patent
Tauferner et al.

(10) Patent No.: US 12,549,348 B2
(45) Date of Patent: Feb. 10, 2026

(54) METHOD FOR RANDOM NUMBER GENERATOR SEED CREATION USING UNINITIALIZED HARDWARE

(71) Applicant: Samsung Electronics Co., Ltd., Suwon-si (KR)

(72) Inventors: Andrew Thomas Tauferner, Rochester, MN (US); Douglas Joseph, Austin, TX (US); Matthew Wolf, Oak Ridge, TN (US)

(73) Assignee: SAMSUNG ELECTRONICS CO., LTD. (KR)

( * ) Notice: Subject to any disclaimer, the term of this patent is extended or adjusted under 35 U.S.C. 154(b) by 185 days.

(21) Appl. No.: 18/453,305

(22) Filed: Aug. 21, 2023

(65) Prior Publication Data

US 2024/0348434 A1 Oct. 17, 2024

Related U.S. Application Data

(60) Provisional application No. 63/495,548, filed on Apr. 11, 2023.

(51) Int. Cl.
*H04L 9/08* (2006.01)
(52) U.S. Cl.
CPC .................................. *H04L 9/0869* (2013.01)
(58) Field of Classification Search
CPC .............................. H04L 9/0869; H04L 9/08
See application file for complete search history.

(56) References Cited

U.S. PATENT DOCUMENTS

| | | | |
|---|---|---|---|
| 6,161,213 A | 12/2000 | Lofstrom | |
| 6,502,116 B1 | 12/2002 | Kelly et al. | |
| 6,738,788 B1 | 5/2004 | Horng et al. | |
| 7,849,120 B2 | 12/2010 | Henry et al. | |
| 8,260,835 B2 | 9/2012 | Fukushima et al. | |
| 2004/0098429 A1 | 5/2004 | Crispin et al. | |
| 2004/0205095 A1 | 10/2004 | Gressel et al. | |
| 2010/0153699 A1 | 6/2010 | Falconer et al. | |
| 2016/0179663 A1* | 6/2016 | Roesch | G09C 1/00 711/103 |
| 2024/0291635 A1* | 8/2024 | Morshed | H04L 9/0894 |

* cited by examiner

*Primary Examiner* — Quazi Farooqui
(74) *Attorney, Agent, or Firm* — Renaissance IP Law Group LLP

(57) ABSTRACT

A computing device includes a memory and a processing device. The memory enters an uninitialized state in response to power being applied to the memory. The processing device is coupled to the memory, and is configured to select a portion of the memory in the uninitialized state to seed a random number generator process. The processing device may alternatively select an uninitialized state of the network hardware that is coupled to the processing device to seed a random number generator process. In one embodiment, the computing device is a compute node in a multi-node processing system, and the memory is a High-Bandwidth Memory.

20 Claims, 2 Drawing Sheets

METHOD FOR RANDOM NUMBER GENERATOR SEED CREATION USING UNINITIALIZED HARDWARE

CROSS-REFERENCE TO RELATED APPLICATION

This application claims the priority benefit under 35 U.S.C. § 119 (e) of U.S. Provisional Application No. 63/495,548, filed on Apr. 11, 2023, the disclosure of which is incorporated herein by reference in its entirety.

TECHNICAL FIELD

The subject matter disclosed herein relates to generation of random numbers. More particularly, the subject matter disclosed herein relates to a system and a method for generating seed values for a random number generating process.

BACKGROUND

Random numbers are used in science, art, statistics, cryptography, security, and other fields. High-quality random numbers are important to these fields. Low-quality random numbers may lead to insecure authentication keys, poor simulations, etc. Some computer systems and embedded devices may be challenged to produce high-quality random numbers because such devices may lack an "individuality" of behavior that is based on a lack of human interaction or other near-random stimuli.

Typical computer systems use various items as an input as a seed for a Random Number Generator (RNG), but many of the seed items may be identical for High Performance Computing (HPC) systems due to a consistent and synchronized behavior of compute nodes of typical HPC systems that normally place hardware (memory, networks, etc.) into a stable operational state as rapidly as possible after power up so that the computer system behaves correctly and thereby avoiding incorrect computation, unreliable storage/retrieval of data, and/or unreliable transmission/reception of data.

SUMMARY

An example embodiment provides a computing device that may include a memory and a processing device. The memory may enter an uninitialized state in response to power being applied to the memory, and the processing device may be coupled to the memory, and may be configured to select a portion of the memory in the uninitialized state to seed a random number generator process. In one embodiment, the memory may include a volatile memory. In another embodiment, the memory may include a High-Bandwidth Memory (HBM). In still another embodiment, the computing device may be a compute node in a multi-node processing system. In yet another embodiment, the portion of the memory selected may include an entirety of the memory, or a region of the memory that may be less than the entirety of the memory. In one embodiment, the portion of the memory selected may include a region of the memory that may be less than an entirety of the memory, and the processing device may be further configured to select a same or a different region of the memory each time power is applied to the memory. In another embodiment, the computing device may be one of a computer system, an information-handling system, a compute node in a High-Performance Computing system, a personal computer, a laptop computer, a notebook-type computer, a tablet-type computer, a smart phone, a cellular telephone, a personal digital assistant, a Machine-to-Machine (M2M) type device, a mobile-type device capable of wirelessly communicating via a wireless network, a User Equipment (UE), a mobile station (MS), and a base station. In still another embodiment, the memory may be part of a communication network coupled to the computing device. In yet another embodiment, the computing device may further include network hardware that may be coupled to the processing device and the network hardware may enter an uninitialized state in response to power being applied to the network hardware, and the processing device may be further configured to select a portion of the memory in the uninitialized state or the uninitialized state of the network hardware and use the uninitialized state selected to seed a random number generator process.

An example embodiment provides a computing device that may include network hardware, and a processing device. The network hardware may enter an uninitialized state in response to power being applied to the network hardware, and the processing device may be coupled to the network hardware and may be configured to use the uninitialized state of the network hardware to seed a random number generator process. In one embodiment, the network hardware may include a volatile memory that enters the uninitialized state in response to power being applied to the network hardware, and the processing device may be further configured to select the uninitialized state of the volatile memory and use the uninitialized state of the volatile memory to seed the random number generator process. In another embodiment, the processing device may be further configured to select a portion of the volatile memory that may include an entirety of the volatile memory, or a selected region of the volatile memory that may be less than the entirety of the volatile memory. In still another embodiment, the processing device may be further configured to select a same or a different region of the volatile memory each time power is applied to the network hardware. In yet another embodiment, the computing device may be a compute node in a multi-node processing system. In one embodiment, the computing device may be one of a computer system, an information-handling system, a compute node in a High-Performance Computing system, a personal computer, a laptop computer, a notebook-type computer, a tablet-type computer, a smart phone, a cellular telephone, a personal digital assistant, a Machine-to-Machine (M2M) type device, a mobile-type device capable of wirelessly communicating via a wireless network, a User Equipment (UE), a mobile station (MS), and a base station. In another embodiment, the computing device may include a memory that may enter an uninitialized state in response to power being applied to the memory, and the processing device may be further configured to select the uninitialized state of the network hardware or a portion of the memory in the uninitialized state and use the uninitialized state selected to seed the random number generator process. In still another embodiment, the memory may include a volatile memory. In yet another embodiment, the memory may be a High-Bandwidth Memory. In one embodiment, the portion of the memory selected may be an entirety of the memory, or a region of the memory that may be less than the entirety of the memory. In another embodiment, the portion of the memory selected may be a selected region of the memory that may be less than an entirety of the memory, and the processing device may be further configured to select a same or a different region of the memory each time power is applied to the memory.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
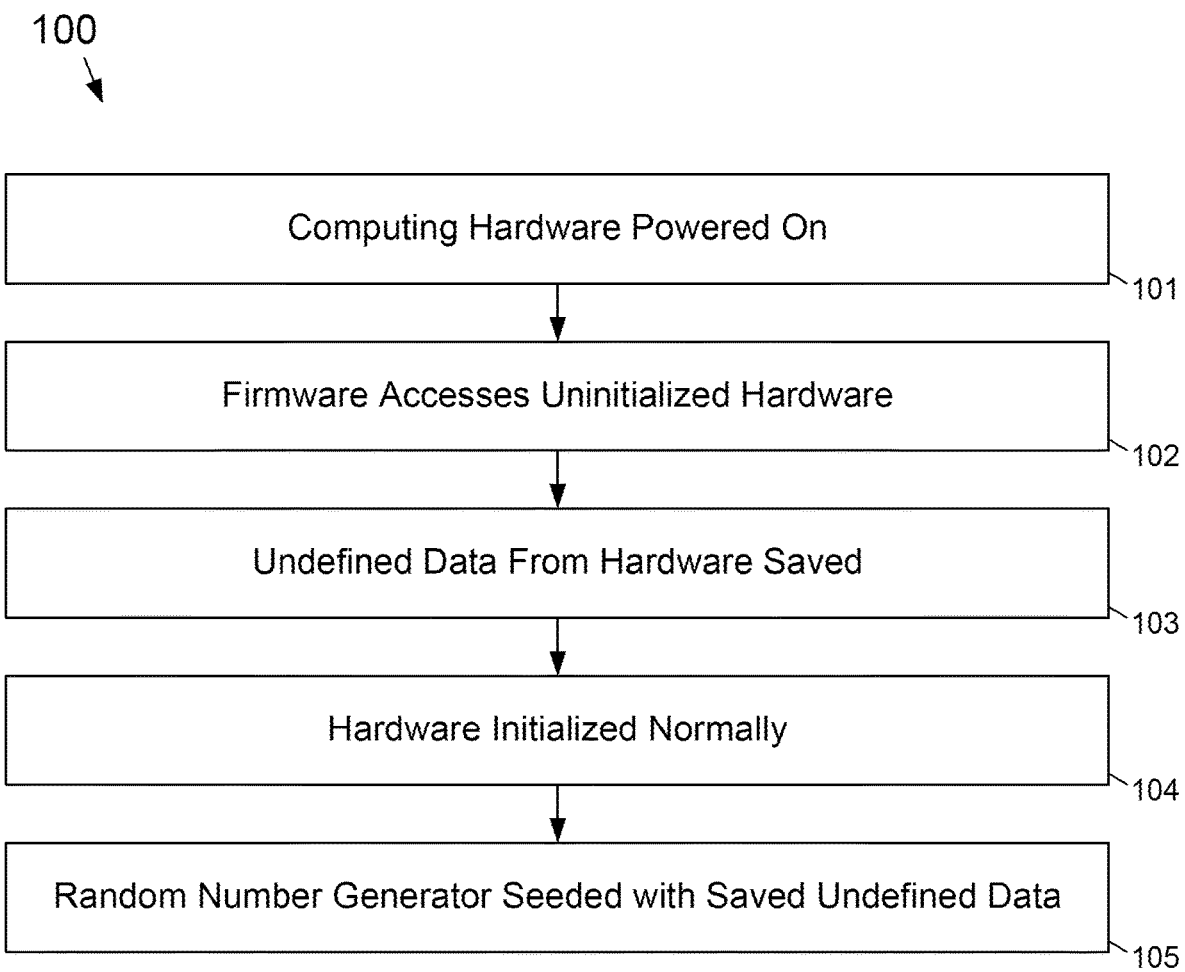
FIG. 1 is a flowchart of an example embodiment of a method that uses uninitiated computer hardware for generating RNG seed data according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a technique that creates a seed and/or entropy data for a random number generation process that utilizes a non-deterministic characteristic of uninitialized computer hardware, such as memory or network hardware connected to a computer system, that occurs during power up prior to system stabilization. The contents of uninitialized memory or the contents of an uninitialized network are undefined and may be near random, and may possibly result in a different RNG seed that occurs every power-on event. Additionally, the uninitialized contents may be resistant to manipulation by external influences. Accordingly, the technique disclosed herein may produce high-quality random numbers from existing computer hardware.

In one example embodiment, the compute nodes of an HPC system may utilize the seed creation technique disclose herein, and each compute node generates different RNG seeds. Examples of computer hardware that may be scanned prior to system stabilization may include, but is not limited to, uninitialized volatile memory and untrained/uninitialized computer networks, etc.

In another example embodiment, the subject matter disclosed herein involves scanning some portion of an uninitialized memory of a compute node or of uninitialized network hardware during power up to create input data for a RNG seed. Different portions of the uninitialized memory or of the uninitialized network hardware may be scanned each time the system is powered, thereby further ensuring that a seed value is not repeated.

FIG. 1 is a flowchart of an example embodiment of a method 100 that uses uninitiated computer hardware for generating RNG seed data according to the subject matter disclosed herein. At 101, computer hardware is powered on. At 102, firmware, i.e., a processor running an initialization process, accesses uninitiated computer hardware, such as memory and/or network hardware (i.e., operational states within the Decision Feedback Equalization (DFE) circuitry and/or states within phase-locked loop (PLL) circuits), prior to the computer hardware being initialized for system stabilization. At 103, the non-deterministic, undefined data obtained by accessing the uninitiated computer hardware is secured or saved. At 104, the computer hardware is initiated normally, thereby establishing system stabilization. At 105, a random number generation process may be seeded with the non-deterministic, undefined data obtained by accessing the uninitiated computer hardware.

Figure 2:
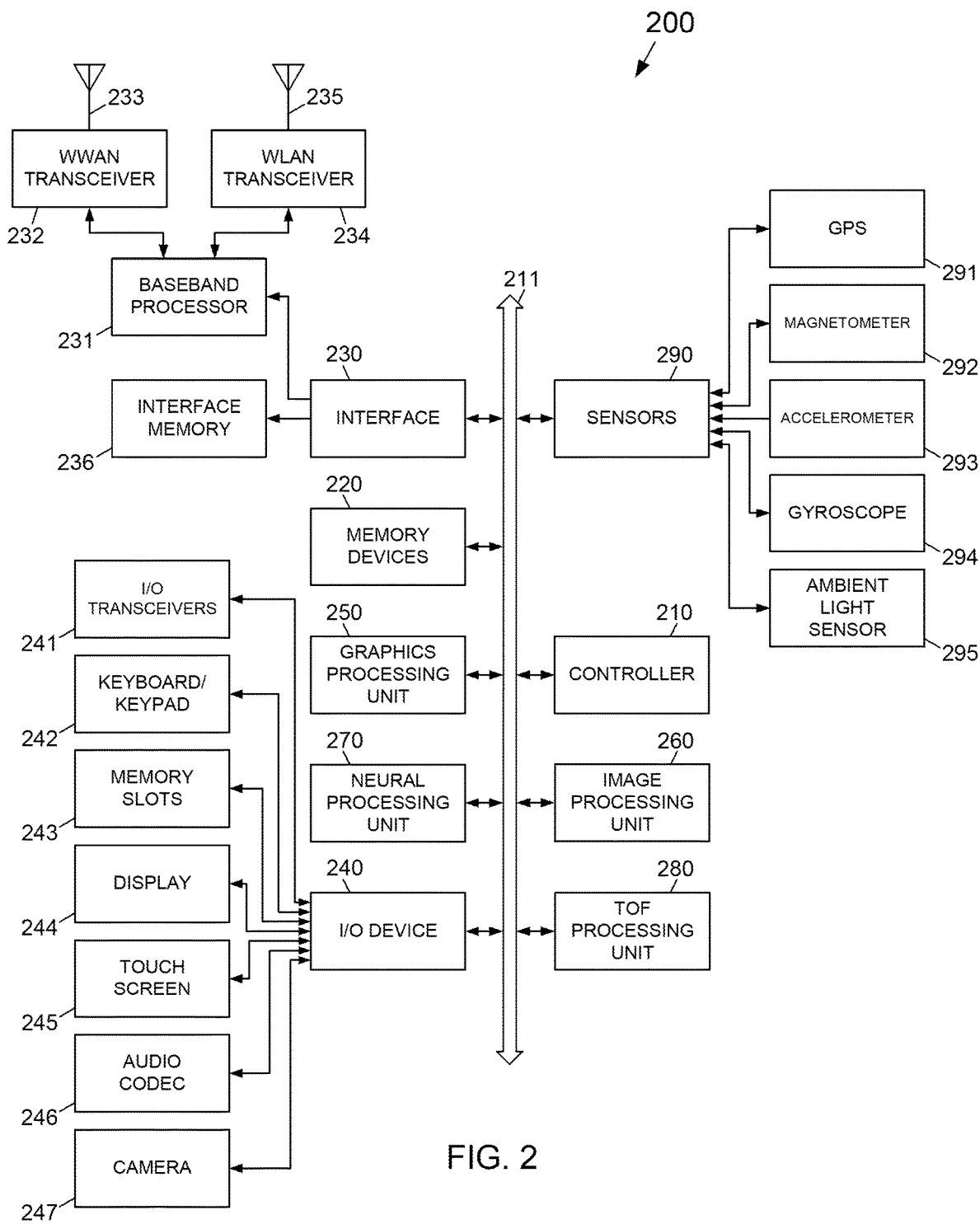
FIG. 2 depicts a functional block diagram of an example electronic device 200 that may be configured to use uninitiated computer hardware for generating RNG seed data according to the subject matter disclosed herein.

FIG. 2 depicts a functional block diagram of an example electronic device 200 that may be configured to use uninitiated computer hardware for generating RNG seed data according to the subject matter disclosed herein. In one example embodiment, the electronic device 200 may be configured as a computer system 200. In another example embodiment, the electronic device 200 may be configured as an information-handling system 200. In still another example embodiment, the electronic device 200 may be configured as a compute node in an HPC system. In still other example embodiments, electronic device 200 may be, but not limited to, a personal computer, a laptop computer, a notebook-type computer, a tablet-type computer, a smart phone, a cellular telephone, a personal digital assistant, a Machine-to-Machine (M2M) type device, a System on a Chip (SoC), an Internet of Things (IoT) device, a mobile-type device capable of wirelessly communicating via a wireless network, a User Equipment (UE), a mobile station (MS), a base station (NB or eNB), or the like. Although electronic device 200 represents one example of several types of computing platforms, electronic device 200 may include more or fewer elements, for or fewer modules, and/or different arrangements of elements and/or modules than shown in FIG. 2, and the scope of the claimed subject matter is not limited in these respects.

The electronic device 200 may include one or more controllers (or CPUs) 210, one or more memory 220, an interface 230, an input/output device 240, a Graphics Processing Unit (GPU) 250, an imaging-processing unit 260, a Time-of-Flight (TOF) processing unit 270, a neural processing unit (NPU) 280, and one or more sensors 290 that are coupled to each other through a bus 211. One or more of the different functional blocks depicted in FIG. 2 may be implemented as modules.

In one or more embodiments, the electronic device 200 may include one or more processors 210, which one or more of the processors may be configured as a general-purpose processor, an application processor, a digital signal processor, a microcontroller, or the like. In one embodiment, the processor 210 may configured to run applications and/or various subsystems of the electronic device 200, such as, but not limited to, a process relating to using uninitiated computer hardware for generating RNG seed data as disclosed herein. The processor 210 may include a single core or alternatively may include multiple processing cores in which one or more of the cores may comprise a digital signal processor or digital signal processing core. Additionally, the processor 210 may be configured to include a graphics processor and/or a coprocessor disposed on the same chip. Alternatively, the GPU 250 may be a separate, discrete graphics chip, as depicted in FIG. 2. The processor 210 may include on-board memory, such as cache memory. In one embodiment, the cache memory may be used as an uninitiated computer hardware for generating RNG seed data according to the subject matter disclosed herein.

The processor 210 may access one or more external memory devices 220, which may include, for example, synchronous dynamic random access memory (SDRAM) for storing and/or executing applications, and/or NAND flash that may store applications and/or data when the electronic device 200 is powered and when powered off. The memory devices 220 may also include High-Bandwidth Memory, DRAM, SDRAM, static random access memory (SRAM), NAND flash, NOR flash, magnetic-based memory, chalcogenide-based memory, phase-change-based memory, optical-based memory, ovonic-based memory, or a combination thereof. In one embodiment, the processor 210 may execute computer-readable instructions stored in SDRAM and/or a NAND flash of the memory devices 220 that when executed result in, a process relating to using uninitiated computer hardware, such as the SDRAM in the memory devices 220, for generating RNG seed data according to the subject matter disclosed herein.

In one example embodiment, the controller 210 may communicate with a baseband processor 231 through the interface 230. The baseband processor 231 may control broadband radio functions for the electronic device 200. The baseband processor 231 may store code for controlling such broadband radio functions in, for example, a NOR flash (not shown). The baseband processor 231 may control a wireless wide area network (WWAN) transceiver 232 that is used for modulating and/or demodulating broadband network signals. The WWAN transceiver 232 may be coupled to one or more power amplifiers (not shown) that are respectively coupled to one or more antennas 233 for sending and receiving radio-frequency signals via the WWAN broadband network. The baseband processor 231 also may control a wireless local area network (WLAN) transceiver 234 coupled to one or more suitable antennas 235. The electronic system 200 may be configured to communicate in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), Fifth-Generation Wireless (5G), Sixth-Generation Wireless (6G), and so forth. It should be noted that the foregoing are merely exemplary implementations for the electronic device 200, and the scope of the claimed subject matter is not limited in these respects.

In one embodiment, the interface 230 may be coupled to an interface memory 236, such as a buffer, that may be used as uninitiated computer hardware by the controller 210 and/or the baseband processor 231 for generating RNG seed data according to the subject matter disclosed herein. The interface memory 236 may be configured to include DRAM, SDRAM, NAND flash, NOR flash, magnetic-based memory, chalcogenide-based memory, phase-change-based memory, optical-based memory, ovonic-based memory, or a combination thereof.

The I/O device 240 may be coupled to one or more I/O devices, such as one or more I/O transceivers 241, a keyboard/keypad 242, one or more memory slots 243, a display 244, a touch screen 245, an audio codec 246, and/or a camera 247. In one embodiment, an I/O transceiver 241 may be configured as a network adapter that may include memory and/or hardware that may be used as uninitiated computer hardware for generating RNG seed data according to the subject matter disclosed herein. In another embodiment, an I/O transceiver 241 may be configured as a universal serial bus (USB) port, a high-definition multimedia interface (HDMI) port, a serial port, and so on.

A memory slot 243 may be configured to receive all types of memory, such as optionally removable memory, such as secure digital (SD) card or a subscriber identity module (SIM) card, although the scope of the claimed subject matter is not limited in these respects. In one embodiment, a memory received by a memory slot 243 may include DRAM, SDRAM, NAND flash, NOR flash, magnetic-based memory, chalcogenide-based memory, phase-change-based memory, optical-based memory, ovonic-based memory, or a combination thereof, and may be used as uninitiated computer hardware for generating RNG seed data according to the subject matter disclosed herein.

In one or more embodiments, the processor 210 may drive the display 244 for displaying various information or data, and may further receive touch input from a user via the touch screen 245, for example, via a finger or a stylus. In one exemplary embodiment, the display 244 and/or the touch screen 245 may display a menu and/or options to a user that are selectable via a finger and/or a stylus for entering information into the electronic device 200. The audio CODEC 246 may be coupled to one or more audio ports (not shown) to provide microphone input and speaker outputs either via internal devices and/or via external devices coupled to the electronic device 200 via the audio ports, for example, via a headphone and microphone jack. One or more cameras 247 may be utilized to capture images that are processed by the processor 210. The images may be temporarily stored in, for example, memory associated with the camera 247, memory received by a memory slot 243, and/or a memory device 220. In one embodiment, the camera 247 may be configured as a 2D image sensor and/or a 3D image sensor that may be coupled to and/or may be part of the imaging processing unit 260. In another embodiment, the camera 247 may be configured to be a 3D image sensor that may be part of the TOF processing unit 270.

The processor 210 may be coupled to one or more sensors 290 for detection of various environmental properties including location, movement, and/or orientation of the electronic device 200. The sensors 290 may include a Global Positioning System (GPS) 291, a magnetometer 292, an accelerometer 293, a gyroscope 294, and/or an ambient light sensor 295. In one embodiment, the GPS 291 may be configured as a Global Navigation Satellite System (GNSS). The ambient light sensor 295 may be utilized to detect an amount of ambient light in which the electronic device 200 is operating, for example, to control a brightness or contrast value for the display 243 as a function of the intensity of ambient light detected by the ambient light sensor 295.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A computing device, comprising:
   a memory that enters an uninitialized state in response to power being applied to the memory; and
   a processing device coupled to the memory, the processing device configured to:
      select a first portion of the memory in the uninitialized state to generate a first value of a first random number generator process; and
      select a second portion of the memory in the uninitialized state to generate a second value of a second random number generator process, the second portion being different from the first portion.

2. The computing device of claim 1, wherein the memory comprises a volatile memory.

3. The computing device of claim 1, wherein the memory comprises a High-Bandwidth Memory (HBM).

4. The computing device of claim 1, wherein the computing device comprises a compute node in a multi-node processing system.

5. The computing device of claim 1, wherein the portion of the memory selected comprises an entirety of the memory, or a region of the memory that is less than the entirety of the memory.

6. The computing device of claim 1, wherein:
   the portion of the memory selected comprises a region of the memory that is less than an entirety of the memory, and
   the processing device is further configured to select a same or a different region of the memory each time power is applied to the memory.

7. The computing device of claim 1, wherein the computing device comprises one of a computer system, an information-handling system, a compute node in a High-Performance Computing system, a personal computer, a laptop computer, a notebook-type computer, a tablet-type computer, a smart phone, a cellular telephone, a personal digital assistant, a Machine-to-Machine (M2M) type device, a mobile-type device capable of wirelessly communicating via a wireless network, a User Equipment (UE), a mobile station (MS), and a base station.

8. The computing device of claim 1, wherein the memory is part of a communication network coupled to the computing device.

9. The computing device of claim 1, further comprising network hardware coupled to the processing device, the network hardware entering an uninitialized state in response to power being applied to the network hardware,
   wherein the processing device is further configured to select a portion of the memory in the uninitialized state or the uninitialized state of the network hardware, and use the uninitialized state selected to seed a random number generator process.

10. A computing device, comprising:
   a network hardware that enters an uninitialized state in response to power being applied to the network hardware; and
   a processing device coupled to the network hardware, the processing device configured to:
      select a first portion of the network hardware in the uninitialized state to generate a first value of a first random number generator process; and
      select a second portion of the network hardware in the uninitialized state to generate a second value of a second random number generator process, the second portion being different from the first portion.

11. The computing device of claim 10, wherein:
   the network hardware comprises a volatile memory that enters the uninitialized state in response to power being applied to the network hardware, and
   the processing device is further configured to select the uninitialized state of the volatile memory and use the uninitialized state of the volatile memory to seed a random number generator process.

12. The computing device of claim 11, wherein the processing device is further configured to select a portion of the volatile memory that comprises an entirety of the volatile memory, or a selected region of the volatile memory that is less than the entirety of the volatile memory.

13. The computing device of claim 12, wherein the processing device is further configured to select a same or a different region of the volatile memory each time power is applied to the network hardware.

14. The computing device of claim 10, wherein the computing device comprises a compute node in a multi-node processing system.

15. The computing device of claim 10, wherein the computing device comprises one of a computer system, an information-handling system, a compute node in a High-Performance Computing system, a personal computer, a laptop computer, a notebook-type computer, a tablet-type computer, a smart phone, a cellular telephone, a personal digital assistant, a Machine-to-Machine (M2M) type device, a mobile-type device capable of wirelessly communicating via a wireless network, a User Equipment (UE), a mobile station (MS), and a base station.

16. The computing device of claim 10, further comprising a memory that enters an uninitialized state in response to power being applied to the memory,
   wherein the processing device is further configured to select the uninitialized state of the network hardware or a portion of the memory in the uninitialized state, and use the uninitialized state selected to seed the random number generator process.

17. The computing device of claim 16, wherein the memory comprises a volatile memory.

18. The computing device of claim 16, wherein the memory comprises a High-Bandwidth Memory (HBM).

19. The computing device of claim 16, wherein the portion of the memory selected comprises an entirety of the memory, or a region of the memory that is less than the entirety of the memory.

20. The computing device of claim 16, wherein:
   the portion of the memory selected comprises a selected region of the memory that is less than an entirety of the memory, and
   the processing device is further configured to select a same or a different region of the memory each time power is applied to the memory.

* * * * *